US010977003B2

(12) United States Patent
Johnson

(10) Patent No.: US 10,977,003 B2
(45) Date of Patent: Apr. 13, 2021

(54) LINEAR FEEDBACK SHIFT REGISTER WITH NEAR-MAXIMAL LENGTH SEQUENCES

(71) Applicant: International Business Machines Corporation, Armonk, NY (US)

(72) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/553,510

(22) Filed: Aug. 28, 2019

(65) Prior Publication Data

US 2021/0064344 A1 Mar. 4, 2021

(51) Int. Cl.
*G06F 7/58* (2006.01)

(52) U.S. Cl.
CPC .................... *G06F 7/584* (2013.01)

(58) Field of Classification Search
CPC ................................. G06F 7/58–588
See application file for complete search history.

(56) References Cited

U.S. PATENT DOCUMENTS

| 3,911,330 A | 10/1975 | Fletcher et al. |
| 8,949,299 B2 | 2/2015 | Wang et al. |
| 2004/0205095 A1 | 10/2004 | Gressel et al. |
| 2005/0207207 A1* | 9/2005 | Gammel ............... G06F 7/584 365/149 |
| 2007/0294327 A1* | 12/2007 | Rajski ..................... H03K 3/84 708/252 |
| 2010/0036899 A1 | 2/2010 | Kaluzhny |

(Continued)

FOREIGN PATENT DOCUMENTS

| CN | 102176693 A | 9/2011 |
| CN | 102282536 A | 12/2011 |
| CN | 104238995 A | 12/2014 |

OTHER PUBLICATIONS

Anonymous, "Quasi-linear reduction of Hamiltonian Cycle Problem (HCP) to Satisfiability Problem (SAT)," an IP.com Prior Art Database Technical Disclosure, IP.com No. IPCOM000237123D, Jun. 4, 2014, 17 pgs.

(Continued)

*Primary Examiner* — Matthew D Sandifer
(74) *Attorney, Agent, or Firm* — Peter K. Suchecki

(57) ABSTRACT

A method and system for using a linear feedback shift register (LFSR) with near-maximal length sequences for generating a pseudo-random sequence for n number of stages, where a maximal length is $2^n-1$. The method includes selecting n, where n requires more than two taps in maximal length linear feedback shift registers; and for the selected n-stage register, using a feedback logical operation of only two XOR gates. The logical operation includes a first logical XOR performed on outputs of two taps, a second logical XOR performed on the output of the first logical XOR and an output of a third tap. The output of the second logical XOR is used as feedback to a first stage of the n-stage register, where one of the taps is an end tap, the other two taps are suitable non-end taps, and the feedback logical operation includes an odd number of gate inversions.

20 Claims, 5 Drawing Sheets

(56) References Cited

U.S. PATENT DOCUMENTS

2013/0191427 A1* 7/2013 Farrugia ............ G06F 7/582
 708/250
2014/0254792 A1 9/2014 Gammel et al.
2016/0211971 A1 7/2016 Lablans
2017/0338946 A1 11/2017 Naslund et al.

OTHER PUBLICATIONS

Dubrova, E. "A List of Maximum Period NLFSRs," https://eprint.iacr.org/2012/166.pdf, Royal Institute of Technology (KTH), Form 120, 164 40 Kista, Sweden, accessed Jul. 10, 2019.

Dubrova, et al., "On Analysis and Synthesis of (n,k)-Non-Linear Feedback Shift Registers," IEEE, Design, Automation and Test in Europe, ©2008 EDAA, 6 pgs.

Johnson, A., "Non-Linear Feedback Shift Register," U.S. Appl. No. 16/553,460, filed Aug. 28, 2019.

List of IBM Patents or Patent Applications Treated as Related, Aug. 21, 2019, 2 pgs.

The University of Texas at Austin, "Technical Reports," Computer Engineering Research Center, https://www.cerc.utexas.edu/reports.html, printed Jul. 10, 2019, 1 pg.

Unknown, "Maximum Period NLFSRs," https://people.kth.se/~dubrova/nlfsr.html, printed Jul. 10, 2019, 2 pgs.

Venkata, "Time Domain Properties of Non-maximal Length Sequences," http://www.iosrjournals.org/iosr-jece/papers/Vol.%2011%20Issue%203/Version-2/P110302101108.pdf, IOSR Journal of Electronics and Communication Engineering (IOSR-JECE), e-ISSN: 2278-2834,p-ISSN: 2278-8735.vol. 11, Issue 3, Ver. II (May-Jun. 2016), pp. 101-108, www.iosrjournals.org.

Wang et al., "High-Speed Hybrid Ring Generator Design Providing Maximum-Length Sequences with Low Hardware Cost," Computer Engineering Research Center, The University of Texas at Austin, https://www.cerc.utexas.edu/reports/UT-CERC-12-01.pdf, Oct. 4, 2011, 13 pgs.

Wang et al., "On Designing Transformed Linear Feedback Shift Registers with Minimum Hardware Cost," Computer Engineering Research Center, Department of Electrical & Computer Engineering, The University of Texas at Austin, https://www.cerc.utexas.edu/reports/UT-CERC-12-03.pdf, Nov. 8, 2011, 17 pgs.

Wikipedia, "Boolean satisfiability problem," https://en.wikipedia.org/wiki/Boolean_satisfiability_problem, printed Jan. 10, 2019, 9 pgs.

Wikipedia, "Conjunctive normal form," https://en.wikipedia.org/wiki/Conjunctive_normal_form, printed Jul. 10, 2019, 4 pgs.

Wikipedia, "Linear-feedback shift register," https://en.wikipedia.org/wiki/Linear-feedback_shift_register, printed Jul. 10, 2019, 8 pgs.

Wikipedia, "Nonlinear-feedback shift register," https://en.wikipedia.org/wiki/Nonlinear-feedback_shift_register, printed Jul. 10, 190, 2 pgs.

Wikipedia, "OR gate," https://en.wikipedia.org/wiki/OR_gate, printed Jul. 10, 2019, 3 pgs.

Wikipedia, "XOR gate," https://en.wikipedia.org/wiki/XOR_gate, printed Jul. 10, 2019, 4 pgs.

Dubrova, E., "A Method for Generating Full Cycles by a Composition of NLFSRs," 2014, 16 pgs.

Vivelid, C., "Nonlinear Feedback Shift Registers and Generating of Binary De Bruijn Sequences," Thesis Document, University of Bergen, 2016, 60 pgs.

International Search Report and Written Opinion, International Application No. PCT/IB2020/057618, dated Dec. 18, 2020, 9 pgs.

* cited by examiner

LINEAR FEEDBACK SHIFT REGISTER WITH NEAR-MAXIMAL LENGTH SEQUENCES

BACKGROUND

The present invention relates to feedback shift registers, and more specifically, to a linear feedback shift register with near-maximal length sequences.

In the field of digital electronic circuits, a linear feedback shift register (LFSR) is a device for generating sequences of $2^n$-1 pseudo-random bits. LFSRs have numerous applications including cryptography, for example, where they are used as key stream generators, data compression, error detection and correction, etc.

A LFSR is a shift register whose input bit is a linear function of its previous state. The most commonly used linear function of single bits is exclusive-or (XOR), and the shift register has an input bit driven by the XOR of some bits of the overall shift register value. Both hardware and software implementations of LFSRs are common.

The bit positions that affect the next state are called the taps. A rightmost bit of the LFSR is called the output bit. In a Fibonacci LFSR, the taps are XOR'd sequentially with the output bit and then fed back into the leftmost bit. The sequence of bits in the rightmost position is called the output stream. A maximum length LFSR produces an n-sequence as it cycles through all possible $2^n$-1 states within the shift register except the state where all bits are zeros. It is also possible to use XNOR resulting in an equivalent polynomial counter.

The arrangement of taps for feedback in an LFSR can be expressed in finite field arithmetic as a polynomial mod 2, where the coefficients of the polynomial must be 1 or 0, referred to as the feedback polynomial.

LFSRs with maximum period can be constructed using a primitive generator polynomial over the binary field. The LFSR is maximal length if the corresponding feedback polynomial is primitive with the number of taps being even, and the set of taps being setwise co-prime.

The following is a table showing the feedback polynomials for n up to 24 bits from which maximal-length LFSRs can be constructed. There can be more than one maximal-length tap sequence for a given LFSR length.

| Register Stage Bit Number (n) | Feedback Polynomial | Maximum Period ($2^n$ − 1) |
|---|---|---|
| 2 | $x^2 + x + 1$ | 3 |
| 3 | $x^3 + x^2 + 1$ | 7 |
| 4 | $x^4 + x^3 + 1$ | 15 |
| 5 | $x^5 + x^3 + 1$ | 31 |
| 6 | $x^6 + x^5 + 1$ | 63 |
| 7 | $x^7 + x^6 + 1$ | 127 |
| 8 | $x^8 + x^6 + x^5 + x^4 + 1$ | 255 |
| 9 | $x^9 + x^5 + 1$ | 511 |
| 10 | $x^{10} + x^7 + 1$ | 1023 |
| 11 | $x^{11} + x^9 + 1$ | 2047 |
| 12 | $x^{12} + x^{11} + x^{10} + x^4 + 1$ | 4095 |
| 13 | $x^{13} + x^{12} + x^{11} + x^8 + 1$ | 8191 |
| 14 | $x^{14} + x^{13} + x^{12} + x^2 + 1$ | 16383 |
| 15 | $x^{15} + x^{14} + 1$ | 32767 |
| 16 | $x^{16} + x^{15} + x^{13} + x^4 + 1$ | 65535 |
| 17 | $x^{17} + x^{14} + 1$ | 131071 |
| 18 | $x^{18} + x^{11} + 1$ | 262143 |
| 19 | $x^{19} + x^{18} + x^{17} + x^{14} + 1$ | 524287 |
| 20 | $x^{20} + x^{17} + 1$ | 1048575 |
| 21 | $x^{21} + x^{19} + 1$ | 2097151 |
| 22 | $x^{22} + x^{21} + 1$ | 4194303 |
| 23 | $x^{23} + x^{18} + 1$ | 8388607 |
| 24 | $x^{24} + x^{23} + x^{22} + x^{17} + 1$ | 16777215 |

The "+1" in the polynomial does not correspond to a tap; it corresponds to the input to the first bit. The powers of the terms relate to the tapped bits, counting from the left. LFSRs with four terms plus the one, require four taps and therefore three XOR gates.

An adaptation is a top-bottom hybrid LFSR generator in which the top LFSR tap is XOR'd with the last tap and the result is fed into the stage after the top tap. The bottom tap is XOR'd with the last tap and the result is fed into the first stage of the shift register. Top-bottom hybrid LFSR generators can be used to reduce the 4 taps to 3 taps (two XORs) as follows:

{8,7,−6}
{12,9,−4}
{13,12,−11}
{14,13,−11}
{16,14,−7}
{19,18,−11}
{24,23,−19} where the first number is the number of stages, the second is the top LFSR tap and the third (indicated as negative) is the bottom LFSR tap. With two XORs, the hybrid LFSR can generate a sequence of $2^n$-1. However, this requires access to both the middle of the shift register and the end to insert data.

SUMMARY

Embodiments of the present disclosure include a method and system for using a linear feedback shift register (LFSR) for generating a pseudo-random sequence with near-maximal length for n number of stages, where a maximal length is $2^n$-1. The method includes selecting n, where n requires more than two taps in maximal length linear feedback shift registers; and for the selected n-stage register, using a feedback logical operation of only two XOR gates. The logical operation includes a first logical XOR performed on outputs of two taps, a second logical XOR performed on the output of the first logical XOR and an output of a third tap. The output of the second logical XOR is used as feedback to a first stage of the n-stage register, where one of the taps is an end tap, the other two taps are suitable non-end taps, and the feedback logical operation includes an odd number of gate inversions. The suitable non-end taps provide near-maximal length sequences of the n-stage register, where near-maximal is defined as a sequence with a length at most 4 away from $2^n$.

Embodiments of the present disclosure include a linear feedback shift register (LFSR) for generating a pseudo-random sequence with near-maximal length for n number of stages. The LFSR includes an n-stage register, where n requires more than two taps in maximal length linear feedback shift registers; a first logic gate having a first input connected to a first tap of the n-stage register and a second input connected to a second tap of the n-stage register; and a second logic gate having a third input connected to an output of the first logic gate and a fourth input connected to a third tap of the n-stage register. The first and second logic gates are each selected from the group consisting of an XOR gate and an XNOR gate. An output of the second logic gate is used as feedback to a first stage of the n-stage register. One of the first, second, and third taps is an end tap and the other two taps are suitable non-end taps. The LFSR includes an odd number of gate inversions and the suitable non-end taps provide near-maximal length sequences of the n-stage register, where near-maximal length sequences are sequences with a length at most 4 away from $2^n$.

Embodiments of the present disclosure include a method and system for providing a linear feedback shift register (LFSR) with near-maximal length sequences for generating a pseudo-random sequence for n number of stages, where a maximal length is $2^n-1$. A processor may select n, where n requires more than two taps in maximal length linear feedback shift registers; and for the selected n-stage register, use a feedback logical operation of only an XNOR gate. The logical operation may include a logical XNOR performed on outputs of three taps, where output of the logical XNOR is used as feedback to a first stage of the n-stage register, where one of the taps is an end tap and the other two taps are suitable non-end taps, and the feedback logical operation includes an odd number of gate inversions. The suitable non-end taps provide near-maximal length sequences of the n-stage register, where near-maximal is defined as a sequence with a length at most 4 away from $2^n$.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
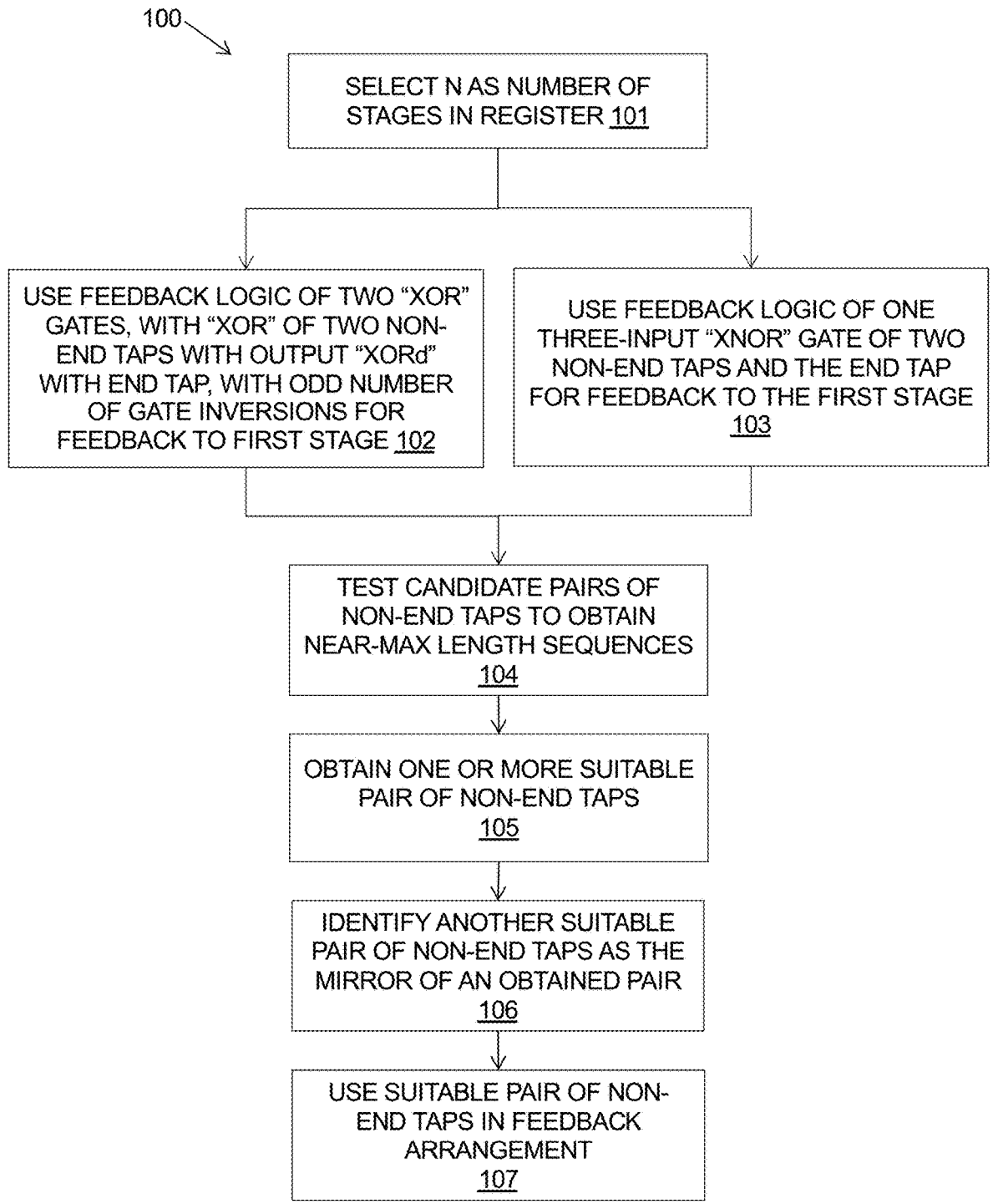
FIG. 1 is a flow diagram of an example embodiment of a method for providing a LFSR, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The described method and system provide a linear feedback shift register (LFSR) with near-maximal length sequences for generating a pseudo-random sequence for some registers having n number of stages that require more than two taps for maximal length in linear feedback shift registers (LFSRs), usually four or more taps. The four taps in LFSRs use three XOR gates.

The maximal length sequences are $2^n-1$, where the missing state is all 0s, or for a complement logical operation, all 1s. Near-maximal is defined for an n register as meaning a sequence with a length at most 4 away from $2^n$.

The method and system have been tested up to n=30, and near-maximal length sequences are achieved using the described linear feedback for n-stage registers that require more than two taps for maximal length sequences in linear feedback arrangements in LFSRs. Other n-stage registers that require more than two taps for maximal length sequences in LFSRs may also exist for n>30, and embodiments disclosed herein may be also applied to those LFSRs with n>30.

A simplified logic operation is provided as feedback in a LFSR that provides a minimum number of only one or two gates with a near-maximal length sequence. Instead of the three XOR gates of an LFSR to obtain maximal length sequences, the disclosed logic operations using only one or two gates are used and result in near-maximal length sequences.

In one embodiment, a first logical operation of only two XOR gates is used, taking logical XOR of two suitable taps and XOR with another suitable tap for feedback to the first stage, where one of the taps is an end tap and the other two taps are suitable non-end taps, and with an odd number of one or more gate inversions.

This embodiment may include the first logical operation taking logical XOR of two suitable non-end taps and XOR with the end tap for feedback to the first stage, and with an odd number of one or more gate inversions, or, alternatively, the first logical operation may take logical XOR of one suitable non-end tap and an end tap and XOR with another suitable non-end tap for feedback to the first stage, and with an odd number of one or more gate inversions.

Equivalent logical operations may be used including any number of NOT gate inversions inserted on the inputs or output of any gate such that the total number of NOTs and XNORs is odd. The odd number of gate inversions may be provided by one of the XOR gates being an XNOR gate.

In another embodiment, a second logical operation is only one three-input inverted XOR gate of two suitable non-end taps and the end tap for feedback to the first stage.

Referring now to FIG. 1, an example embodiment of the described method 100 for providing a LFSR is shown in a flow diagram, in accordance with embodiments of the present disclosure.

The method 100 begins by selecting n as the number of stages in the register, where n requires more than two taps in a maximal length linear feedback shift register. This is illustrated at step 101. A normal Fibonacci LFSR requires 4 or more taps, but may be implemented with 3 taps by a hybrid LFSR, so n requires more than 2 taps.

For a selected n-stage register, the method 100 uses a feedback logical operation of either of two embodiments. In one embodiment, the method uses a feedback logical operation of only two XOR gates, taking logical XOR of two suitable taps and XOR with another suitable tap for feedback to the first stage, where one of the taps is an end tap and the other two taps are suitable non-end taps, and with an odd number of one or more gate inversions. This is illustrated at step 102. In another embodiment, the method 100 uses only one three-input inverted XOR gate of two suitable non-end taps and the end tap for feedback to the first stage. This is illustrated at step 103.

The method 100 continues by testing different combinations of candidate pairs of non-end taps to determine pair combinations that provide near-maximal length sequences of the n-stage register by searching for suitable pairs of non-end taps using three taps: the end tap, and candidate pairs of non-end taps, using every logic operation of three bits subject to the optimization restriction that 1 and 0 are equally likely. This is illustrated at step 104. If is were more likely than 0s as output for all the possible inputs, then the outputs in general would have more is than 0s, so the counter could not cover almost all the states.

For an n-stage register, there would be (n-1)*(n-2)/2 possibilities to consider. The number of possible pairs to search may be determined as: selecting the last tap for the XOR, selecting one of the n-1 other taps for the first XOR input, selecting one of the n-2 remaining taps for the second input, and dividing the possibilities by 2, as the order of the XOR inputs does not matter.

The register may be initialized to a value other than all 0000s or all 1111s and may run the register at most $2^n$ times until it generates a register state which has been seen before. The length of the sequence is the number of states from the first occasion that the repeated state was seen to the second occasion.

For a near-maximal length sequence, it may be determined if the number of states seen so far is $2^{n-1}$ or more. If it is, then any other sequence generated from a different starting state cannot be as long. If it is not, then choose a state not seen so far and generate the sequence again. Measure the length of this sequence. Repeat this process all the states are seen, or the number of unseen states is less than the length of the longest sequence found so far.

The method 100 continues by obtaining one or more suitable pairs of non-end taps. This is illustrated at step 105. For each suitable pair of non-end taps, the method may identify 106 another suitable pair of non-end taps as the mirror of the taps in the n-stage register, wherein tap sequence [n, A, B] mirrors to [n, n-B, n-A].

The method 100 continues by using a suitable pair of non-end taps in the feedback logic arrangement of the register. This is illustrated at step 107.

Figure 2:
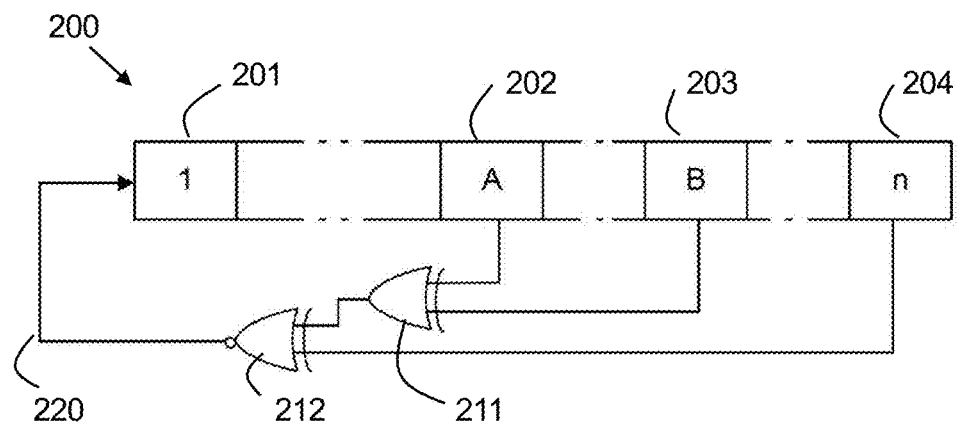
FIG. 2 is a schematic circuit diagram of a generalized stage LFSR, in accordance with a first embodiment of the present disclosure.
Figure 3:
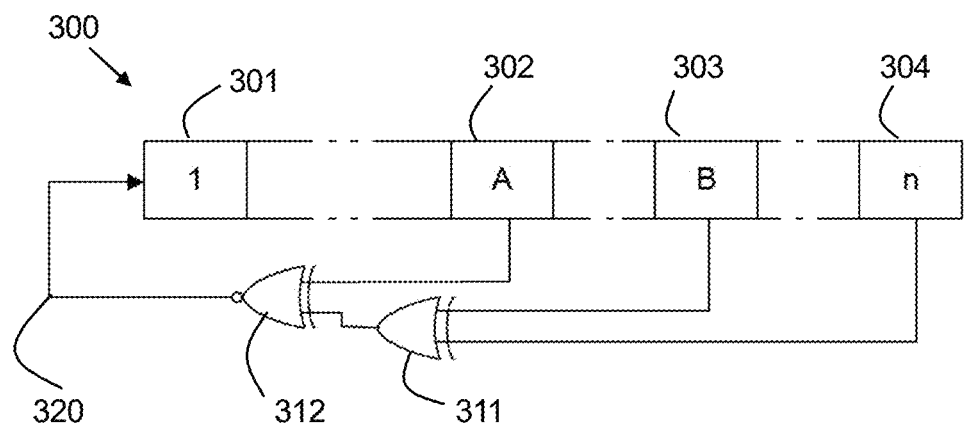
FIG. 3 is a schematic circuit diagram of a generalized stage LFSR, in accordance with a second embodiment of the present disclosure.

FIG. 2 and FIG. 3 show first and second embodiments of generalized n-stage LFSRs 200, 300 with feedback logical operations according to two variants of the described first logical arrangement with two XOR gates. n is restricted to n-stage registers that require more than two taps for maximal length sequences in linear feedback arrangements in LFSRs, and for which suitable non-end taps are found, for example, using the method 100 of FIG. 1. The suitable non-end taps are the same for the first and second embodiments as XORing three inputs does not depend on the order. In this description, taps are referred to by number in a register (e.g., their position) with the input first stage as 1 and the end stage as n.

Referring now to FIG. 2, shown is an example register 200 with a first embodiment of the described logical feedback of only one XOR 211 and only one XNOR gate 212, for n number of stages, numbered "1" 201 to "n" 204 from left to right in the register 200.

Inputs for the XOR gate 211 are the outputs of two suitable stages "A" 202 and "B" 203, where A, B<n and A≠B and where A and B are suitable non-end taps. Inputs for the XNOR gate 212 are the output of stage n 204 and the output of the XOR gate 211. The input 220 for stage 1 201 is the output of the XNOR gate 212.

Referring now to FIG. 3, shown is an example register 300 with a second embodiment of the described logical feedback of only one XOR 311 and only one XNOR gate 312, for n number of stages, numbered "1" 301 to "n" 304 from left to right in the register 300.

Inputs for the XOR gate 311 are the output of one suitable stage "B" 303 and the output of stage n 304. Inputs for the XNOR gate 312 are the output of one suitable stage "A" 302 and the output of the XOR gate 311, where A, B<n and A≠B and where A and B are suitable non-end taps. The input 320 for stage 1 301 is the output of the XNOR gate 312.

In the first and second embodiments of the logical feedback of FIG. 2 and FIG. 3, the XOR gates 211, 311 and the XNOR gates 212, 312 may be swapped. Additional gate inversions may be included as long as there are an odd number of inversions.

The non-end taps A 202, 302 and B 203, 303 in the first and second embodiments are the same suitable non-end taps, as XORing three inputs does not depend on order.

The first embodiment shows the logical operation of (A XOR B) XNOR C and the second embodiment shows the logical operation of (B XOR C) XNOR A.

Equivalents may also be used including the following:
NOT((A XOR B) XOR C)-definition of XNOR;
NOT((A XOR (B XOR C))-distributive;
NOT(A) XOR (B XOR C)-insert NOT in different places;
A XOR (NOT(B) XOR C)-insert NOT in different places;
A XOR (B XOR NOT(C))-insert NOT in different places;
(NOT(A) XOR B) XOR C-insert NOT in different places;
(A XOR (NOT(B)) XOR C-insert NOT in different places;
(A XOR B) XOR NOT(C)-insert NOT in different places;
More NOTs may be inserted:
NOT((NOT(A) XOR NOT(B)) XOR C);
NOT((A XOR NOT(B)) XOR NOT(C));
NOT((NOT(A) XOR B) XOR NOT(C));
Etc.

The first embodiment and its equivalents provide a circuit using inputs A, B, C with a XOR/XNOR gate operating on any two inputs, the output of which is fed together with the remaining input to a second XNOR/XOR gate which goes to the input of the shift register, plus any number of NOT gate inversions inserted on the inputs or output of any gate such that the total number of NOTs and XNORs is odd.

Figure 4:
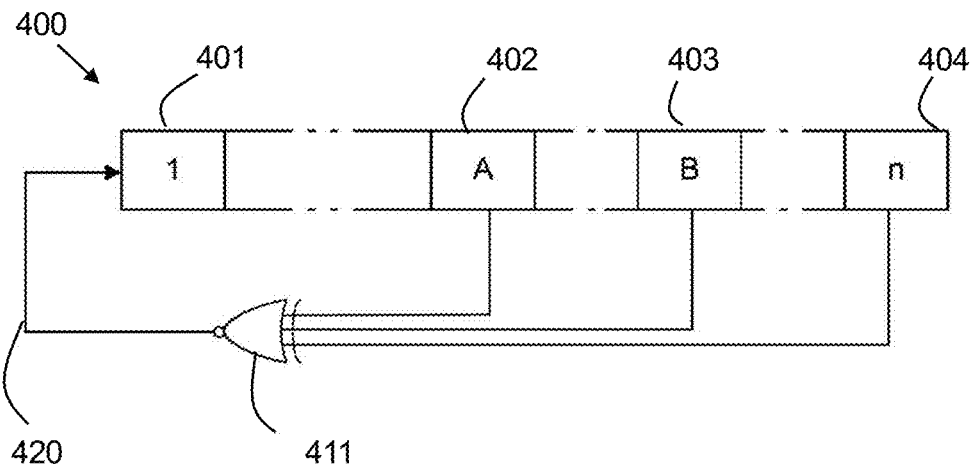
FIG. 4 is a schematic circuit diagram of a generalized stage LFSR, in accordance with a third embodiment of the present disclosure.

Referring now to FIG. 4, shown is an example register 400 with a third embodiment of the described logical feedback of only one three-input XNOR gate 411, for n number of stages, numbered "1" 401 to "n" 404 from left to right in the register 400.

Inputs for the XNOR gate 411 are the output of two suitable stages "A" 402 and "B" 403, where A, B<n and A≠B, where A and B are suitable non-end taps, and the output of stage n 404. The input 420 for stage 1 401 is the output of the XNOR gate 411.

Figure 5:
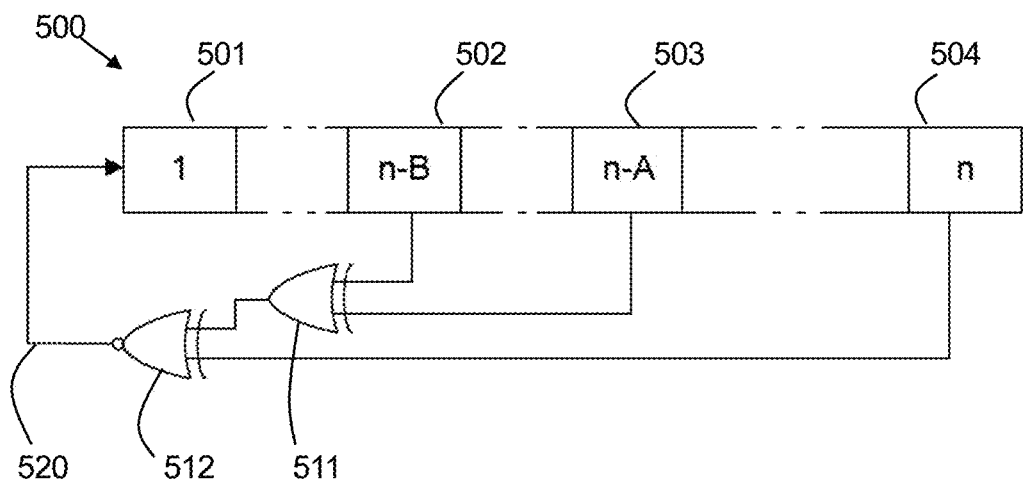
FIG. 5 is a schematic circuit diagram of a mirror generalized stage LFSR, in accordance with a fourth embodiment of the present disclosure.

Referring now to FIG. 5, shown is an example register 500 with a fourth embodiment of the described logical feedback of only one XOR 511 and only one XNOR gate 512, for n number of stages, numbered "1" 501 to "n" 504 from left to right in the register 500. This fourth embodiment is a mirror or reverse of the logical arrangement of the first embodiment of FIG. 2.

Inputs for the XOR gate 511 are the outputs of two mirror suitable stages "n-B" 502 and "n-A" 503. Inputs for the XNOR gate 512 are the output of stage n 504 and the output of the XOR gate 511. The input 520 for stage 1 501 is the output of the XNOR gate 512.

Equivalent mirror arrangements may also be provided for the logical arrangement of the second and third embodiments.

In the example of an n-stage register with n up to 24, the set n={8, 12, 13, 14, 16, 19, 24} are the registers for which four taps are required in a LFSR. However, n may be extended higher than 24.

Figure 6:
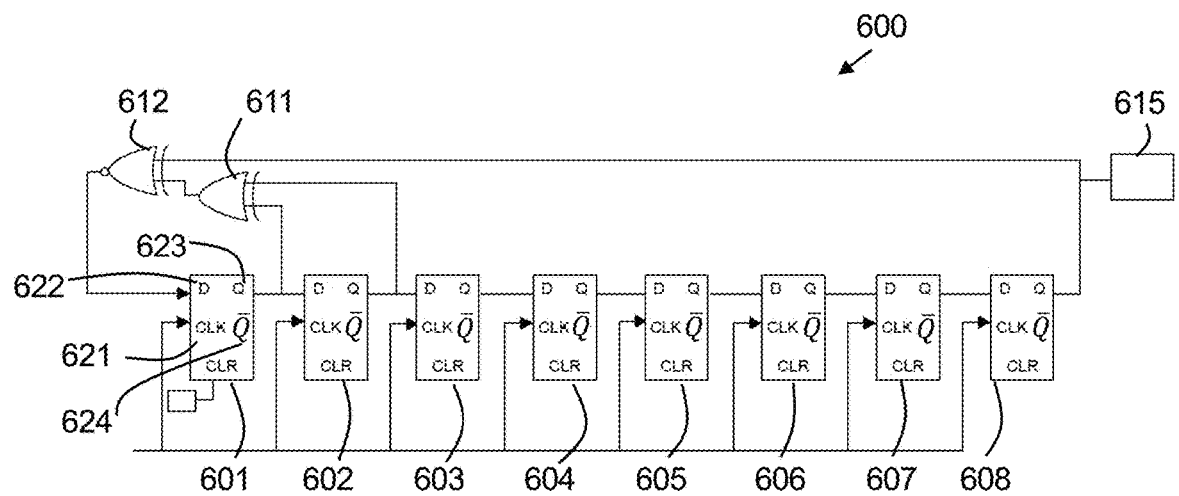
FIG. 6 is a schematic circuit diagram showing more details of a register of the first embodiment of FIG. 2.

Referring now to FIG. 6, shown is an example embodiment of the register 200 of FIG. 2. FIG. 6 shows a register with the eight stages provided by D-type flip flops 601-608. Each flip flop 601-608 has a clock input (CLK) 621, data input (D) 622, and outputs (Q) 623, inverted output (Q) 624.

The register 600 includes non-end taps 601 and 602, end tap 608, and the feedback logical operation provided by an XOR gate 611 and an XNOR gate 612. The register output 615 is also shown.

Figure 7:
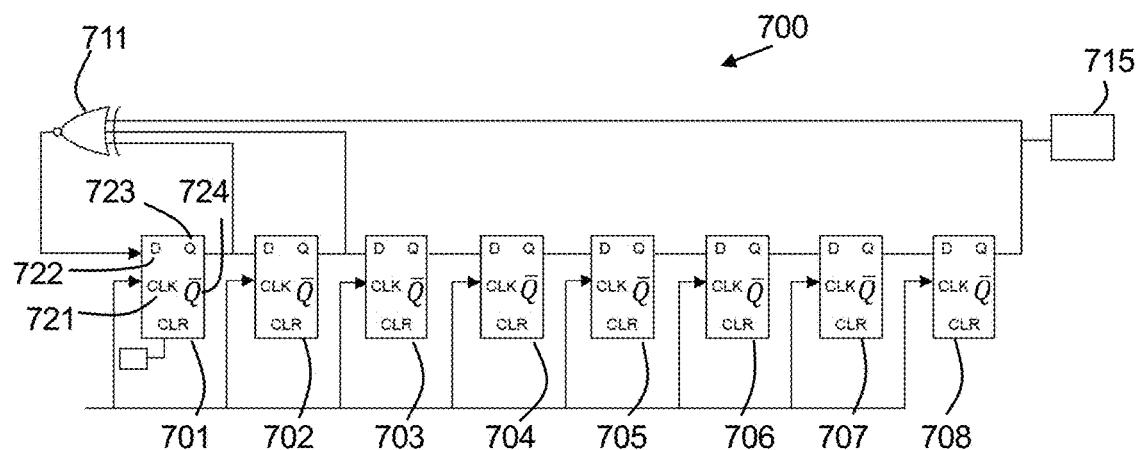
FIG. 7 is a schematic circuit diagram showing more details of a register of the third embodiment of FIG. 4.

Referring now to FIG. 7, shown is an example embodiment of the register 400 of FIG. 4. FIG. 7 shows a register with the eight stages provided by D-type flip flops 701-708. Each flip flop 701-708 has a clock input (CLK) 721, data input (D) 722, and outputs (Q) 723, inverted output (Q) 724.

The register 700 includes non-end taps 701 and 702, end tap 708, and the feedback logical operation provided by a three-input XNOR gate 711. The register output 715 is also shown.

Suitable taps for each n have been found as follows:

| n-sage Register | Selected Taps | Near-maximal length achieved | Maximal length possible |
|---|---|---|---|
| 8 | 8, 2, 1 | 254 | 255 |
| 8 | 8, 4, 1 | 254 | 255 |
| 8 | 8, 4, 3 | 254 | 255 |
| 8 | 8, 5, 4 | 254 | 255 |
| 8 | 8, 6, 1 | 254 | 255 |
| 8 | 8, 7, 2 | 254 | 255 |
| 8 | 8, 7, 4 | 254 | 255 |
| 8 | 8, 7, 6 | 254 | 255 |
| 12 | 12, 3, 1 | 4092 | 4095 |
| 12 | 12, 7, 2 | 4094 | 4095 |
| 12 | 12, 10, 5 | 4094 | 4095 |
| 13 | 13, 2, 1 | 8188 | 8191 |
| 13 | 13, 6, 5 | 8188 | 8191 |
| 13 | 13, 7, 4 | 8188 | 8191 |
| 13 | 13, 8, 7 | 8188 | 8191 |
| 13 | 13, 9, 2 | 8188 | 8191 |
| 13 | 13, 9, 6 | 8188 | 8191 |
| 13 | 13, 11, 4 | 8188 | 8191 |
| 13 | 13, 12, 11 | 8188 | 8191 |
| 14 | 14, 2, 1 | 16382 | 16383 |
| 14 | 14, 4, 3 | 16382 | 16383 |
| 14 | 14, 5, 2 | 16382 | 16383 |
| 14 | 14, 7, 2 | 16382 | 16383 |
| 14 | 14, 8, 5 | 16382 | 16383 |
| 14 | 14, 9, 4 | 16382 | 16383 |
| 14 | 14, 9, 6 | 16382 | 16383 |
| 14 | 14, 10, 5 | 16382 | 16383 |
| 14 | 14, 11, 2 | 16382 | 16383 |
| 14 | 14, 11, 10 | 16382 | 16383 |
| 14 | 14, 12, 3 | 16382 | 16383 |
| 14 | 14, 12, 7 | 16382 | 16383 |
| 14 | 14, 12, 9 | 16382 | 16383 |
| 14 | 14, 13, 12 | 16382 | 16383 |
| 16 | 16, 2, 1 | 65534 | 65535 |
| 16 | 16, 5, 4 | 65534 | 65535 |
| 16 | 16, 6, 3 | 65534 | 65535 |
| 16 | 16, 8, 7 | 65534 | 65535 |
| 16 | 16, 9, 8 | 65534 | 65535 |
| 16 | 16, 10, 5 | 65534 | 65535 |
| 16 | 16, 11, 2 | 65534 | 65535 |
| 16 | 16, 11, 4 | 65534 | 65535 |
| 16 | 16, 11, 6 | 65534 | 65535 |
| 16 | 16, 12, 3 | 65534 | 65535 |
| 16 | 16, 12, 5 | 65534 | 65535 |
| 16 | 16, 12, 11 | 65534 | 65535 |
| 16 | 16, 13, 2 | 65534 | 65535 |
| 16 | 16, 13, 4 | 65534 | 65535 |
| 16 | 16, 13, 10 | 65534 | 65535 |
| 16 | 16, 14, 1 | 65534 | 65535 |
| 16 | 16, 14, 3 | 65534 | 65535 |
| 16 | 16, 14, 5 | 65534 | 65535 |
| 16 | 16, 15, 2 | 65534 | 65535 |
| 16 | 16, 15, 14 | 65534 | 65535 |
| 19 | 19, 3, 2 | 524284 | 524287 |
| 19 | 19, 5, 3 | 524286 | 524287 |
| 19 | 19, 7, 1 | 524286 | 524287 |
| 19 | 19, 11, 7 | 524286 | 524287 |
| 19 | 19, 12, 6 | 524286 | 524287 |
| 19 | 19, 12, 8 | 524286 | 524287 |
| 19 | 19, 13, 1 | 524286 | 524287 |
| 19 | 19, 13, 7 | 524286 | 524287 |
| 19 | 19, 16, 14 | 524286 | 524287 |
| 19 | 19, 18, 6 | 524286 | 524287 |
| 19 | 19, 18, 12 | 524286 | 524287 |
| 24 | 24, 2, 1 | 16777214 | 16777215 |
| 24 | 24, 7, 6 | 16777214 | 16777215 |
| 24 | 24, 8, 3 | 16777214 | 16777215 |
| 24 | 24, 9, 8 | 16777214 | 16777215 |
| 24 | 24, 11, 10 | 16777214 | 16777215 |
| 24 | 24, 12, 1 | 16777214 | 16777215 |
| 24 | 24, 12, 5 | 16777214 | 16777215 |
| 24 | 24, 13, 6 | 16777214 | 16777215 |
| 24 | 24, 14, 7 | 16777214 | 16777215 |
| 24 | 24, 14, 13 | 16777214 | 16777215 |
| 24 | 24, 15, 2 | 16777214 | 16777215 |
| 24 | 24, 16, 3 | 16777214 | 16777215 |
| 24 | 24, 16, 5 | 16777214 | 16777215 |
| 24 | 24, 16, 15 | 16777214 | 16777215 |
| 24 | 24, 17, 4 | 16777214 | 16777215 |
| 24 | 24, 17, 10 | 16777214 | 16777215 |
| 24 | 24, 18, 1 | 16777214 | 16777215 |
| 24 | 24, 18, 11 | 16777214 | 16777215 |
| 24 | 24, 18, 17 | 16777214 | 16777215 |
| 24 | 24, 19, 8 | 16777214 | 16777215 |
| 24 | 24, 19, 12 | 16777214 | 16777215 |
| 24 | 24, 20, 3 | 16777214 | 16777215 |
| 24 | 24, 20, 7 | 16777214 | 16777215 |
| 24 | 24, 21, 2 | 16777214 | 16777215 |
| 24 | 24, 21, 4 | 16777214 | 16777215 |
| 24 | 24, 21, 8 | 16777214 | 16777215 |
| 24 | 24, 21, 16 | 16777214 | 16777215 |
| 24 | 24, 22, 3 | 16777214 | 16777215 |
| 24 | 24, 22, 9 | 16777214 | 16777215 |
| 24 | 24, 23, 6 | 16777214 | 16777215 |
| 24 | 24, 23, 12 | 16777214 | 16777215 |
| 24 | 24, 23, 22 | 16777214 | 16777215 |

In some cases, a hybrid LFSR can generate a sequence of $2^n-1$ with two XORs. However, this has the disadvantage of requiring access to both the middle of the shift register and the end to insert data. The LFSRs disclosed herein just require access to the end to insert data (although data is read from taps in the middle of the register).

From tests, the following provide examples of the longest non-maximal length sequences with 2 taps, with the maximal possible with 3 (hybrid) or 4 taps in parentheses.

{8,5}: 217 (255)
{12,11}: 3255 (4095)
{13,10}: 8001 (8191)
{14,13}: 11811 (16383)
{16,9}: 63457 (65535)
{19,13}520065 (524287)
{24,19} 16766977 (16777215)

The described method gives a useful increase in cycle length for a small gate count.

Figure 8:
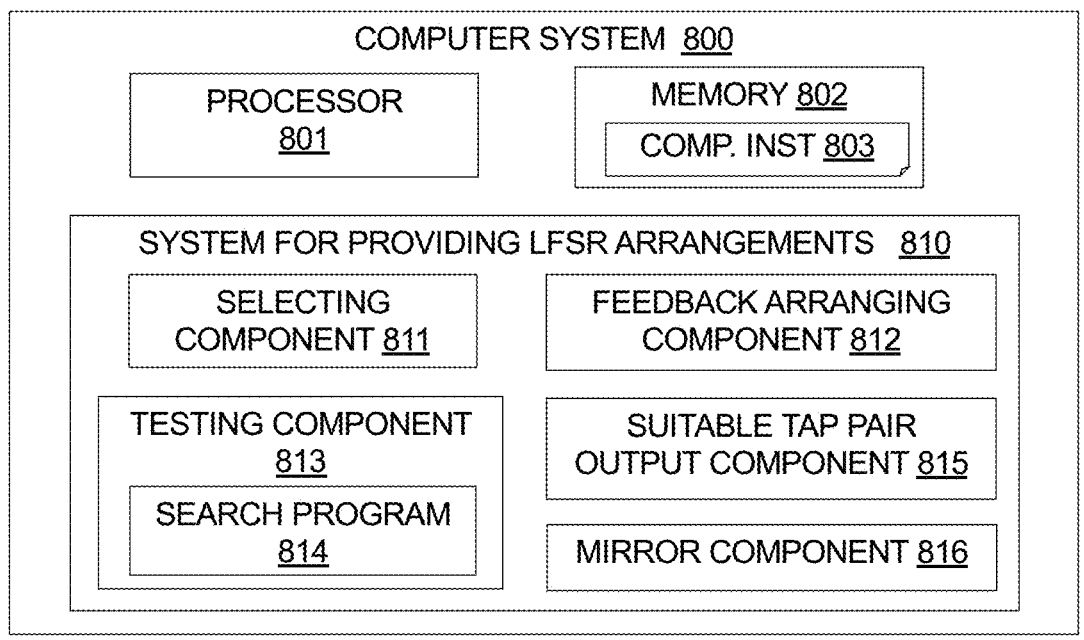
FIG. 8 is block diagram of an example embodiment of a system, in accordance with embodiments of the present disclosure.

Referring to FIG. 8, a block diagram shows a computer system 800 including a system for providing LFSR arrangements with near-maximal length sequences 810.

The computer system 800 may include at least one processor 801, a hardware module, or a circuit for executing the functions of the described components which may be software units executing on the at least one processor. Multiple processors running parallel processing threads may be provided enabling parallel processing of some or all of the functions of the components. Memory 802 may be configured to provide computer instructions 803 to the at least one processor 801 to carry out the functionality of the components.

The system for providing LFSR arrangements 810 may include a selecting component 811 for selecting n, where n requires more than two taps in maximal length linear feedback shift registers.

The system 810 includes a feedback arranging component 812 for arranging a feedback logical operation as described herein. The feedback logical operation may be only two XOR gates, taking logical XOR of two suitable taps and XOR with another suitable tap for feedback to the first stage, where one of the taps is an end tap and the other two taps are suitable non-end taps, and with an odd number of one or more gate inversions. Alternatively, the feedback logical operation may be only one three-input inverted XOR gate of two suitable non-end taps and the end tap for feedback to the first stage.

The system 810 may include a testing component 813 for obtaining one or more suitable pairs of non-end taps by testing different combinations of two non-end taps to determine pair combinations that provide near-maximal length sequences of the n-stage register. The testing component 813 may include a search program 814 operating on three taps: the end tap, and two non-end taps, using every combination of the logic operation subject to the optimization restriction that 1 and 0 are equally likely. The system 810 may include a suitable tap pair output component 815 for outputting suitable non-end tap pairs for use in the feedback arranging component 812.

The system 810 may include a mirror component 816 for taking one suitable pair of non-end taps and obtaining another suitable pair of non-end taps as the mirror of the taps in the n-stage register, wherein tap sequence [n, A, B] mirrors to [n, n-B, n-A].

Figure 9:
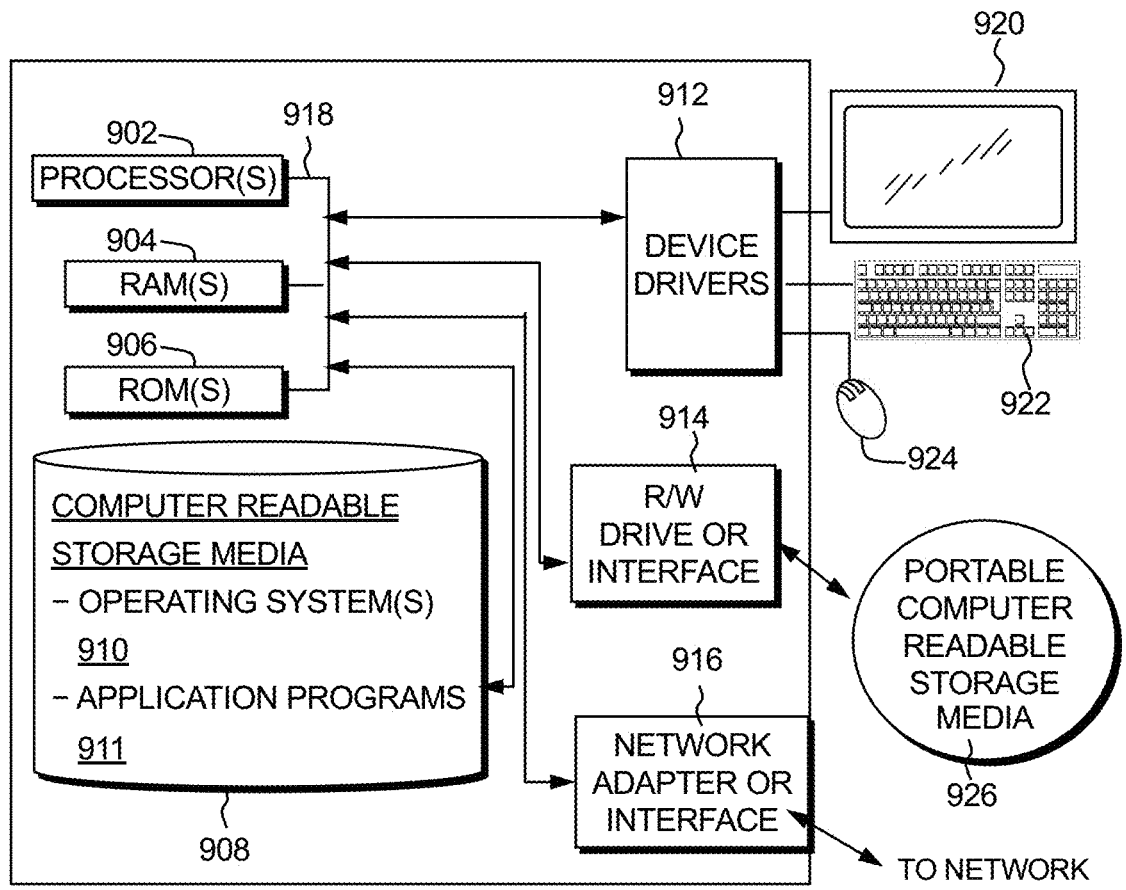
FIG. 9 is a block diagram of an embodiment of a computer system in which embodiments of the present disclosure may be implemented.

FIG. 9 depicts a block diagram of components of the computer system 800 of FIG. 8, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computer system 800 can include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within the system.

One or more operating systems 910, and application programs 911, such as the system for providing LFSR arrangements 810 are stored on one or more of the computer readable storage media 908 for execution by one or more of the processors 902 via one or more of the respective RAMs 904 (which typically include cache memory). In the illustrated embodiment, each of the computer readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computer system 800 can also include a R/W drive or interface 914 to read from and write to one or more portable computer readable storage media 926. Application programs 911 on computer system 800 can be stored on one or more of the portable computer readable storage media 926, read via the respective R/W drive or interface 914 and loaded into the respective computer readable storage media 908.

Computer system 800 can also include a network adapter or interface 916, such as a TCP/IP adapter card or wireless communication adapter. Application programs 911 on computer system 800 can be downloaded to the computing device from an external computer or external storage device via a network (for example, the Internet, a local area network or other wide area networks or wireless networks) and network adapter or interface 916. From the network adapter or interface 916, the programs may be loaded into the computer readable storage media 908. The network may comprise copper wires, optical fibers, wireless transmission, routers, firewalls, switches, gateway computers and edge servers.

Computer system 800 can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 can comprise hardware and software stored in computer readable storage media 908 and/or ROM 906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to an aspect of the present invention there is provided a method for using a linear feedback shift register (LFSR) with near-maximal length sequences for generating a pseudo-random sequence for n number of stages, wherein a maximal length is $2^n-1$, comprising: selecting n, where n requires more than two taps in maximal length linear feedback shift registers; and for the selected n-stage register, using a feedback logical operation of: a first logical operation of only two XOR gates, taking logical XOR of two suitable taps and XOR with another suitable tap for feedback to a first stage, where one of the taps is an end tap and the other two taps are suitable non-end taps, and with an odd number of one or more gate inversions; or a second logical operation of only one three-input inverted XOR gate of two suitable non-end taps and the end tap for feedback to a first stage; wherein the suitable non-end taps provide near-maximal length sequences of the n-stage register, wherein near-maximal is defined as a sequence with a length at most 4 away from $2^n$.

In embodiments, the first logical operation takes logical XOR of two suitable non-end taps and XOR with the end tap for feedback to the first stage, and with an odd number of one or more gate inversions. In another embodiment, the first logical operation takes logical XOR of one suitable non-end tap and an end tap and XOR with another suitable non-end tap for feedback to the first stage, and with an odd number of one or more gate inversions.

In embodiments, the odd number of one or more gate inversions is provided by one of the XOR gates being an XNOR gate.

In embodiments, the method may include any number of NOT gate inversions inserted on the inputs or output of any gate such that the total number of NOTs and XNORs is odd.

According to another aspect of the present invention there is provided a linear feedback shift register (LFSR) with near-maximal length sequences for generating a pseudo-random sequence for n number of stages, wherein a maximal length is $2^n$-1, comprising: an n-stage register, where n requires more than two taps in maximal length linear feedback shift registers; a feedback logical operation of a first logical operation of only two XOR gates, taking logical XOR of two suitable taps and XOR with another suitable tap for feedback to a first stage, where one of the taps is an end tap and the other two taps are suitable non-end taps, and with an odd number of one or more gate inversions; or a second logical operation of only one three-input inverted XOR gate of two suitable non-end taps and the end tap for feedback to a first stage; wherein the suitable non-end taps provide near-maximal length sequences of the n-stage register, wherein near-maximal is defined as a sequence with a length at most 4 away from $2^n$.

In embodiments, the first logical operation takes logical XOR of two suitable non-end taps and XOR with the end tap for feedback to the first stage, and with an odd number of one or more gate inversions. In another embodiment, the first logical operation takes logical XOR of one suitable non-end tap and an end tap and XOR with another suitable non-end tap for feedback to the first stage, and with an odd number of one or more gate inversions.

In embodiments, the odd number of one or more gate inversions is provided by one of the XOR gates being an XNOR gate.

In embodiments, the method may include any number of NOT gate inversions inserted on the inputs or output of any gate such that the total number of NOTs and XNORs is odd.

According to a further aspect of the present invention there is provided a method for providing a linear feedback shift register (LFSR) with near maximal length sequences for generating a pseudo-random sequence for n number of stages, wherein a maximal length is $2^n$-1, comprising: selecting n, where n requires more than two taps in maximal length linear feedback shift registers; for a selected n-stage register, using a feedback logical operation of: a first logical operation of only two XOR gates, taking logical XOR of two suitable taps and XOR with another suitable tap for feedback to a first stage, where one of the taps is an end tap and the other two taps are suitable non-end taps, and with an odd number of one or more gate inversions; or a second logical operation of only one three-input inverted XOR gate of two suitable non-end taps and the end tap for feedback to a first stage; and obtaining one or more suitable pairs of non-end taps by testing different combinations of two non-end taps to determine pair combinations that provide near-maximal length sequences of the n-stage register, wherein near-maximal is defined as a sequence with a length at most 4 away from $2^n$.

In embodiments, the method may include obtaining one suitable pair of non-end taps and obtaining another suitable pair of non-end taps as the mirror of the taps in the n stage register, wherein tap sequence [n, A, B] mirrors to [n, n-B, n-A].

In embodiments, obtaining one or more suitable pairs of non-end taps includes using a search program operating on three taps: the end tap, and two non-end taps, using every combination of the logic operation, except all zeros, subject to the optimization restriction that 1 and 0 are equally likely.

In embodiments, the search program is initialized to a value other than all zeros or all ones, and running the register at most $2^n$ times until a register state is generated that is a repeat with the length of the sequence being the number of states from the first occasion a state was seen to a second occasion the state was seen.

In embodiments, the search program determines if the number of states seen so far is $2^{n-1}$ or more. if it is, then the longest sequence found is the longest possible for that set of taps; if it is not, then a state not seen is chosen and the sequence generated again and the length measured; and repeats these steps until all the states are seen or the number of unseen states is less than the length of the longest sequence found.

According to a further aspect of the present invention there is provided a system for providing a linear feedback shift register (LFSR) with near-maximal length sequences for generating a pseudo-random sequence for n number of stages, wherein a maximal length is $2^n$-1, comprising: a selecting component for selecting n, where n requires more than two taps in maximal length linear feedback shift registers; a feedback arranging component for arranging a feedback logical operation of a first logical operation of only two XOR gates, taking logical XOR of two suitable taps and XOR with another suitable tap for feedback to a first stage, where one of the taps is an end tap and the other two taps are suitable non-end taps, and with an odd number of one or more gate inversions; or a second logical operation of only one three-input inverted XOR gate of two suitable non-end taps and the end tap for feedback to a first stage; a testing component for obtaining one or more suitable pairs of non-end taps by testing different combinations of two non-end taps to determine pair combinations that provide near-maximal length sequences of the n-stage register, wherein near-maximal is defined as a sequence with a length at most 4 away from $2^n$.

In embodiments, the system may include a mirror component for taking one suitable pair of non-end taps and obtaining another suitable pair of non-end taps as the mirror of the taps in the n stage register, wherein tap sequence [n, A, B] mirrors to [n, n-B, n-A].

In embodiments, the testing component for obtaining one or more suitable pairs of non-end taps includes a search program operating on three taps: the end tap, and two non-end taps, using every combination of the logic operation, except all zeros, subject to the optimization restriction that 1 and 0 are equally likely.

Method and system are provided for using a linear feedback shift register (LFSR) with near-maximal length sequences for generating a pseudo-random sequence for n number of stages, wherein a maximal length is $2^n$-1. The method includes: selecting n, where n requires more than two taps in maximal length linear feedback shift registers; and for the selected n stage register, using a feedback logical operation of: a first logical operation of only two XOR gates, taking logical XOR of two suitable taps and XOR with another suitable tap for feedback to a first stage, where one of the taps is an end tap and the other two taps are suitable non-end taps, and with an odd number of one or more gate inversions; or a second logical operation of only one three-input inverted XOR gate of two suitable non-end taps and the end tap for feedback to a first stage. The suitable non-end taps provide near-maximal length sequences of the n stage register, wherein near-maximal is defined as a sequence with a length at most 4 away from $2^n$.

What is claimed is:

1. A method for using a linear feedback shift register (LFSR) for generating a pseudo-random sequence with near-maximal length for n number of stages, wherein a maximal length is $2^n-1$, comprising:
   selecting n as the number of stages in the LFSR, where n requires more than two taps in maximal length linear feedback shift registers; and
   generating, for the selected n-stage register, the pseudo-random sequence using a feedback logical operation of only two XOR gates and a number of gate inversions, the logical operation including:
   a first logical XOR performed on outputs of two taps,
   a second logical XOR performed on the output of the first logical XOR and an output of a third tap,
   wherein output of the second logical XOR is used as feedback to a first stage of the n-stage register, wherein one of the taps is an end tap and the other two taps are suitable non-end taps, and wherein the feedback logical operation includes an odd number of gate inversions;
   wherein the suitable non-end taps provide near-maximal length sequences of the n-stage register, wherein near-maximal is defined as a sequence with a length at most 4 away from $2^n$.

2. The method as claimed in claim 1, wherein the first logical XOR is performed using outputs from the two suitable non-end taps, and the second logical XOR is performed using output from the end tap.

3. The method as claimed in claim 1, wherein the first logical XOR is performed using outputs of one suitable non-end tap and the end tap, and the second logical XOR is performed using output from a second suitable non-end tap.

4. The method as claimed in claim 1, wherein the odd number of gate inversions is provided by one of the XOR gates being an XNOR gate.

5. The method as claimed in claim 1, including any number of NOT gate inversions inserted on the inputs or output of any gate such that the total number of NOTs and XNORs is odd.

6. The method as claimed in claim 1, wherein the n-stage register has a number of stages n that is selected from the group consisting of: 8, 12, 13, 14, 16, 19, 24, 27, and 30 stages; and
   wherein the two suitable non-end taps include a first non-end tap A and a second non-end tap B, and wherein the first and second non-end taps are at positions selected from the group consisting of:
   for n=8: A=2, B=1; A=4, B=1; A=4, B=3; A=6, B=1; A=7, B=6; A=7, B=4; A=5, B=4; and A=7, B=2;
   for n=12: A=7, B=2; A=10, B=5; A=3, B=1; and A=11, B=9;
   for n=13: A=2, B=1; A=6, B=5; A=7, B=4; A=9, B=2; A=12, B=11; A=8, B=7; A=9, B=6; and A=11, B=4;
   for n=14: A=2, B=1; A=4, B=3; A=5, B=2; A=7, B=2; A=8, B=5; A=9, B=4; A=11, B=2; A=13, B=12; A=11, B=10; A=12, B=9; A=12, B=7; A=9, B=6; A=10, B=5; and A=12, B=3;
   for n=16: A=2, B=1; A=5, B=4; A=6, B=3; A=8, B=7; A=10, B=5; A=11, B=2; A=11, B=4; A=12, B=3; A=13, B=2; A=14, B=1; A=15, B=14; A=12, B=11; A=13, B=10; A=9, B=8; A=11, B=6; A=14, B=5; A=12, B=5; A=13, B=4; A=14, B=3; A=15, B=2; A=7, B=1; and A=15, B=9;
   for n=19: A=5, B=3; A=7, B=1; A=11, B=7; A=12, B=6; A=13, B=1; A=16, B=14; A=18, B=12; A=12, B=8; A=13, B=7; A=18, B=6; A=3, B=2; A=8, B=5; A=10, B=7; A=11, B=2; A=17, B=16; A=14, B=11; A=12, B=9; and A=17, B=8;
   for n=24: A=2, B=1; A=7, B=6; A=8, B=3; A=9, B=8; A=11, B=10; A=12, B=1; A=12, B=5; A=13, B=6; A=14, B=7; A=15, B=2; A=16, B=3; A=16, B=5; A=17, B=4; A=18, B=1; A=20, B=3; A=21, B=2; A=23, B=22; A=18, B=17; A=21, B=16; A=16, B=15; A=14, B=13; A=23, B=12; A=19, B=12; A=18, B=11; A=17, B=10; A=22, B=9; A=21, B=8; A=19, B=8; A=20, B=7; A=23, B=6; A=21, B=4; A=22, B=3; A=3, B=1; A=15, B=5; A=23, B=21; and A=19, B=9;
   for n=26: A=4, B=1; A=5, B=4; A=8, B=5; A=10, B=9; A=11, B=2; A=12, B=1; A=12, B=9; A=15, B=4; A=15, B=10; A=16, B=9; A=18, B=1; A=22, B=1; A=25, B=22; A=22, B=21; A=21, B=18; A=17, B=16; A=24, B=15; A=25, B=14; A=17, B=14; A=22, B=11; A=16, B=11; A=17, B=10; A=25, B=8; A=25, B=4; A=17, B=1; A=19, B=3; A=25, B=9; and A=23, B=7;
   for n=27: A=5, B=1; A=6, B=2; A=7, B=3; A=10, B=6; A=11, B=3; A=11, B=7; A=13, B=5; A=15, B=1; A=17, B=7; A=26, B=22; A=25, B=21; A=24, B=20; A=21, B=17; A=24, B=16; A=20, B=16; A=22, B=14; A=26, B=12; A=20, B=10; A=3, B=2; A=16, B=9; A=20, B=1; A=25, B=24; A=18, B=11; and A=26, B=7; and
   for n=30: A=7, B=6; A=11, B=4; A=12, B=11; A=13, B=2; A=16, B=9; A=18, B=11; A=20, B=3; A=22, B=3; A=23, B=4; A=26, B=3; A=24, B=23; A=26, B=19; A=19, B=18; A=28, B=17; A=21, B=14; A=19, B=12; A=27, B=10; A=27, B=8; A=26, B=7; A=27, B=4; A=9, B=5; and A=25, B=21.

7. The method as claimed in claim 1, the method further comprising:
   obtaining one or more suitable pairs of non-end taps by identifying, based on the number of stages n, pair combinations that provide at least near-maximal length sequences of the n-stage register, wherein near-maximal is defined as a sequence with a length at most 4 away from $2^n$.

8. The method as claimed in claim 7, wherein obtaining one or more suitable pairs of non-end taps includes:
   determining a first suitable pair of non-end taps that includes a first non-end tap A and a second non-end tap B; and
   obtaining a second suitable pair of non-end taps as the mirror of the first suitable pair of non-end taps in the n-stage register, wherein tap sequence [n, A, B] mirrors to [n, n-B, n-A].

9. The method as claimed in claim 7, wherein obtaining one or more suitable pairs of non-end taps includes using a search program operating on three taps: the end tap, and two non-end taps, using every combination of the logic operation, except all zeros, subject to the optimization restriction that 1 and 0 are equally likely.

10. The method as claimed in claim 9, wherein the search program initializes the register to a value other than all zeros, and runs the register at most $2^n$ times until a register state is generated that is a repeat, wherein a length of the sequence is a number of states from a first occasion a state was seen to a second occasion the state was seen.

11. The method as claimed in claim 10, wherein, for a near maximal length sequence for a set of taps, the search program:
   determines if the number of states seen so far is $2^{n-1}$ or more;
   if the number of states seen is $2^{n-1}$ or more, then the longest sequence found is the longest possible for that set of taps;
   if the number of states seen is less than $2^{n-1}$, then a new state is chosen, the sequence is generated again, and the length measured; and
   repeats these steps until all the states are seen or the number of unseen states is less than the length of the longest sequence found.

12. A linear feedback shift register (LFSR) for generating a pseudo-random sequence with near-maximal length for n number of stages, comprising:
   an n-stage register, where n requires more than two taps in maximal length linear feedback shift registers;
   a first logic gate having a first input connected to a first tap of the n-stage register and a second input connected to a second tap of the n-stage register; and
   a second logic gate having a third input connected to an output of the first logic gate and a fourth input connected to a third tap of the n-stage register,
   wherein:
   the first and second logic gates are each selected from the group consisting of an XOR gate and an XNOR gate;
   an output of the second logic gate is used as feedback to a first stage of the n-stage register,
   one of the first, second, and third taps is an end tap and the other two taps are suitable non-end taps,
   the LFSR includes an odd number of gate inversions, and
   the suitable non-end taps provide pseudo-random sequences with near-maximal length as output of the n-stage register, near-maximal length sequences being sequences with a length at most 4 away from $2^n$.

13. The linear feedback shift register as claimed in claim 12, wherein the first and second taps are the suitable non-end taps, and the third tap is the end-tap.

14. The linear feedback shift register as claimed in claim 12, wherein the first and third taps are the suitable non-end taps, and the second tap is the end-tap.

15. The linear feedback shift register as claimed in claim 12, wherein the odd number of gate inversions is provided by one of the first or second gates being an XNOR gate and the other gate being an XOR gate.

16. The linear feedback shift register as claimed in claim 12, including any number of NOT gate inversions inserted on the inputs or output of any gate such that the total number of NOTs and XNORs is odd.

17. The linear feedback shift register as claimed in claim 12, wherein the n-stage register has a number of stages n that is selected from the group consisting of: 8, 12, 13, 14, 16, 19, 24, 27, and 30 stages; and
   wherein the two suitable non-end taps include a first non-end tap A and a second non-end tap B, and wherein the first and second non-end taps are at positions selected from the group consisting of:
   for n=8: A=2, B=1; A=4, B=1; A=4, B=3; A=6, B=1; A=7, B=6; A=7, B=4; A=5, B=4; and A=7, B=2;
   for n=12: A=7, B=2; A=10, B=5; A=3, B=1; and A=11, B=9;
   for n=13: A=2, B=1; A=6, B=5; A=7, B=4; A=9, B=2; A=12, B=11; A=8, B=7; A=9, B=6; and A=11, B=4;
   for n=14: A=2, B=1; A=4, B=3; A=5, B=2; A=7, B=2; A=8, B=5; A=9, B=4; A=11, B=2; A=13, B=12; A=11, B=10; A=12, B=9; A=12, B=7; A=9, B=6; A=10, B=5; and A=12, B=3;
   for n=16: A=2, B=1; A=5, B=4; A=6, B=3; A=8, B=7; A=10, B=5; A=11, B=2; A=11, B=4; A=12, B=3; A=13, B=2; A=14, B=1; A=15, B=14; A=12, B=11; A=13, B=10; A=9, B=8; A=11, B=6; A=14, B=5; A=12, B=5; A=13, B=4; A=14, B=3; A=15, B=2; A=7, B=1; and A=15, B=9;
   for n=19: A=5, B=3; A=7, B=1; A=11, B=7; A=12, B=6; A=13, B=1; A=16, B=14; A=18, B=12; A=12, B=8; A=13, B=7; A=18, B=6; A=3, B=2; A=8, B=5; A=10, B=7; A=11, B=2; A=17, B=16; A=14, B=11; A=12, B=9; and A=17, B=8;
   for n=24: A=2, B=1; A=7, B=6; A=8, B=3; A=9, B=8; A=11, B=10; A=12, B=1; A=12, B=5; A=13, B=6; A=14, B=7; A=15, B=2; A=16, B=3; A=16, B=5; A=17, B=4; A=18, B=1; A=20, B=3; A=21, B=2; A=23, B=22; A=18, B=17; A=21, B=16; A=16, B=15; A=14, B=13; A=23, B=12; A=19, B=12; A=18, B=11; A=17, B=10; A=22, B=9; A=21, B=8; A=19, B=8; A=20, B=7; A=23, B=6; A=21, B=4; A=22, B=3; A=3, B=1; A=15, B=5; A=23, B=21; and A=19, B=9;
   for n=26: A=4, B=1; A=5, B=4; A=8, B=5; A=10, B=9; A=11, B=2; A=12, B=1; A=12, B=9; A=15, B=4; A=15, B=10; A=16, B=9; A=18, B=1; A=22, B=1; A=25, B=22; A=22, B=21; A=21, B=18; A=17, B=16; A=24, B=15; A=25, B=14; A=17, B=14; A=22, B=11; A=16, B=11; A=17, B=10; A=25, B=8; A=25, B=4; A=17, B=1; A=19, B=3; A=25, B=9; and A=23, B=7;
   for n=27: A=5, B=1; A=6, B=2; A=7, B=3; A=10, B=6; A=11, B=3; A=11, B=7; A=13, B=5; A=15, B=1; A=17, B=7; A=26, B=22; A=25, B=21; A=24, B=20; A=21, B=17; A=24, B=16; A=20, B=16; A=22, B=14; A=26, B=12; A=20, B=10; A=3, B=2; A=16, B=9; A=20, B=1; A=25, B=24; A=18, B=11; and A=26, B=7; and
   for n=30: A=7, B=6; A=11, B=4; A=12, B=11; A=13, B=2; A=16, B=9; A=18, B=11; A=20, B=3; A=22, B=3; A=23, B=4; A=26, B=3; A=24, B=23; A=26, B=19; A=19, B=18; A=28, B=17; A=21, B=14; A=19, B=12; A=27, B=10; A=27, B=8; A=26, B=7; A=27, B=4; A=9, B=5; and A=25, B=21.

18. A system for providing a linear feedback shift register (LFSR) with near-maximal length sequences for generating a pseudo-random sequence for n number of stages, wherein a maximal length is $2^n-1$, comprising:
   a processor; and
   a computer-readable storage medium communicatively coupled to the processor and storing program instructions which, when executed by the processor, cause the processor to perform a method comprising:
   selecting n as the number of stages in the LFSR, where n requires more than two taps in maximal length linear feedback shift registers; and
   generating, for the selected n-stage register, the pseudo-random sequence using a feedback logical operation of only an XNOR gate and a number of gate inversions, the logical operation including:
   a logical XNOR performed on outputs of three taps, wherein output of the logical XNOR is used as feedback to a first stage of the n-stage register, wherein one of the taps is an end tap and the other two taps are suitable non-end taps, and wherein the feedback logical operation includes an odd number of gate inversions;

wherein the suitable non-end taps provide near-maximal length sequences of the n-stage register, and wherein near-maximal is defined as a sequence with a length at most 4 away from $2^n$.

19. The system of claim 18, wherein the method performed by the processor further comprises:

obtaining one or more suitable pairs of non-end taps by identifying, based on the number of stages n, pair combinations that provide at least near-maximal length sequences of the n-stage register, wherein near-maximal is defined as a sequence with a length at most 4 away from $2^n$.

20. The system of claim 19, wherein obtaining one or more suitable pairs of non-end taps includes:

determining a first suitable pair of non-end taps that includes a first non-end tap A and a second non-end tap B; and obtaining a second suitable pair of non-end taps as the mirror of the first suitable pair of non-end taps in the n-stage register, wherein tap sequence [n, A, B] mirrors to [n, n-B, n-A].

* * * * *